United States Patent [19]

Agarwal

[11] Patent Number: 4,668,473
[45] Date of Patent: May 26, 1987

[54] CONTROL SYSTEM FOR ETHYLENE POLYMERIZATION REACTOR

[75] Inventor: Suresh C. Agarwal, Euclid, Ohio

[73] Assignee: The Babcock & Wilcox Company, New Orleans, La.

[21] Appl. No.: 769,782

[22] Filed: Aug. 23, 1985

Related U.S. Application Data

[63] Continuation of Ser. No. 488,283, Apr. 25, 1983, abandoned.

[51] Int. Cl.$^4$ .............................. B01J 3/04; G05D 7/00
[52] U.S. Cl. ...................................... 422/62; 422/109; 422/111; 422/132; 422/134; 364/500
[58] Field of Search .................. 422/62, 109, 110, 111, 422/132, 134; 364/500, 496, 502, 557; 526/59-61, 64; 585/263, 401, 501, 950, 951

[56] References Cited

U.S. PATENT DOCUMENTS

| | | | |
|---|---|---|---|
| 3,250,757 | 5/1966 | Smith et al. | 422/110 |
| 3,254,965 | 6/1966 | Ogle | 422/111 |
| 3,594,557 | 7/1971 | Anderson | 526/61 |
| 3,594,559 | 7/1971 | Pemberton | 526/60 |
| 3,636,326 | 1/1972 | Smith et al. | 526/60 |
| 3,728,085 | 4/1973 | Horiguchi et al. | 422/111 |
| 3,951,604 | 4/1976 | Smith et al. | 422/111 |
| 4,008,049 | 2/1977 | Clemmer et al. | 422/134 |
| 4,488,239 | 12/1984 | Agarwal | 422/62 |
| 4,491,924 | 1/1985 | Agarwal | 422/62 |
| 4,500,490 | 2/1985 | Hutson, Jr. | 422/62 |
| 4,533,517 | 8/1985 | Hofferber | 422/62 |
| 4,543,637 | 9/1985 | Smith et al. | 364/500 |

Primary Examiner—David L. Lacey
Attorney, Agent, or Firm—Vytas R. Matas; Robert J. Edwards

[57] ABSTRACT

A control apparatus for a tubular polymerization reactor having a feed line for a raw material to be polymerized, a cooling circuit for cooling the reactor with a flow of coolant and exit line for a product polymerization, comprises a quality sensor for sensing the actual quality of the product in the exit line, a quality controller for receiving a desired product quality set point and comparing it with the actual quality of the product to generate a desired temperature value for the reactor, temperature sensors for determining the maximum temperature of the reactor and a temperature controller for controlling the amount of coolant supplied to the reactor by the cooling circuit. The temperature controller compares the maximum temperature of the reactor with a desired temperature value therefor corresponding to the desired quantity to control the cooling circuit accordingly. A production rate controller is also provided which controls the rate of production by regulating the amount of raw material flow to the reactor as a function of the concentration of raw material in the exit line from the reactor. The amount of catalyst supplied to the feed line is regulated as a function of raw material concentration of the feed line or flow of raw material in the feed line. The control apparatus also optimizes the process by maximizing reactor temperature, catalyst flow rate, coolant flow rate, reactor exit temperature and maximum polymerization in the reactor.

10 Claims, 7 Drawing Figures

CONTROL SYSTEM FOR ETHYLENE POLYMERIZATION REACTOR

This application is a continuation of application Ser. No. 06/488,283 filed Apr. 25, 1983, now abandoned.

FIELD AND BACKGROUND OF THE INVENTION

The present invention relates in general to tubular polymerization reactors and in particular to a new and useful control system for the polymerization of ethylene, which also includes features for optimizing the polymerization process. The control system of the invention is for the type of tubular reactor wherein heat removal is accomplished by externally cooling the reactor tube.

Low density polyethylene is an important basic polymer in a consumer oriented society. Over the years, its manufacturing processes have changed from the use of continuous stirred tank reactors to the use of tubular reactors for polymerization. This is in large part due to process economics.

The use of tubular reactors for ethylene polymerization instead of autoclave type reactors, is disclosed in *Polyolefin Production Processes - Latest Developments,* M. P. Sittig, Noyes Data Corp., Park Ridge, N.J., 1976.

Most low density polyethylene is made at high pressures ranging from 1,000 to 3,350 atm. pressure using a free radical initiator/catalyst such as peroxides, nitrogen compounds and metallic catalysts. The basic steps in the process are the initial compression of purified ethylene to the reactor pressure, introduction of free radical initiator/catalyst at some stage of compression, polymerization and removal of exothermic heat of reaction, reaction mixture let down, product separation and finishing. A tubular reactor for accomplishing at least some of these steps is disclosed in U.S. Pat. No. 4,008,049 to Clemmer et al.

Since ethylene polymerization is an exothermic process, exothermic heat must be removed. Such heat removal has been achieved by externally cooling the reactor tube, feeding a portion of cool ethylene feed as a starting material, to a high temperature reactor zone.

It is also important that ethylene feed to the reactor be 99.9% pure and acetylene free. Commonly acceptable limits for acetylene are less than 10 ppm. Ethylene gas feed should also contain less than 400 ppm oxygen since higher oxygen content results in lower reaction rate and thus lower polymer yield.

The iniator/catalyst, as noted above are free radicals and predominantly oxides and peroxides. From 0.01 to 10% by weight may be added, based upon desired polymer weight. Liquid catalyst is injected at multiple points in connecting lines between one or more compressers and the reactor, at a temperature higher than the polymer melting point.

Temperatures of 180° to 200° C. are commonly used in high pressure polymerization. Actual operating temperature depends on the temperature required for thermal decomposition of catalyst to provide free radicals for initiation of polymerization.

This reactor operating tempertture is well above the critical temperature of ethylene. High operating pressures are therefore required to force the ethylenemolecules together and insure that free radicals will collide with an ethyl molecule during their short lifetime. The above mentioned operating pressure range is therefore used in the low density polyethylene process.

Major problems exist in known ethylene polymerization processes using tubular reactors.

One of these problems is that product quality is achieved by maintaining reactor temperature at a prespecified level. That is, there is no direct product quality control. This approach results in significant fluctuations in product quality due to variations in reactor temperature caused by discharging reactor products through let down valves. A polymer-ethylene mixture is discharged from the reactor tube by opening and closing such a let down valve to lower reactor pressure intermittently. This causes pressure fluctuations of 200 to 1,000 $Kg/Cm^2$.

Another problem is that the application of excessive cooling lowers reactor cooling zone temperature and results in polymer deposits on the tube wall. Pressure drops appear as a consequence and, in a worst case, the reactor tube may become clogged. This may result in damage to the equipment.

A further problem is that the amount of catalyst added is based on feed flow rate to the reactor. This is fixed for the operation since it is considered independent of feed flow rate as the catalyst control system does not account for variations in the feed flow rate.

A still further problem of the prior art is that significant amounts of operator attention is required during the process. This is because an operator must not only observe the process behaviour but must also adjust set points for temperature and catalyst, based on his knowledge of the process and a relationship of product quality vs. reactor temperature and catalyst flow rate vs. feed flow rate.

SUMMARY OF THE INVENTION

The present invention is drawn to a system and method for controlling and optimizing a polymerization reactor, in particularly a tube reactor for polyolefin, and more particularly polyethylene production.

Objects of the invention are to provide such a system and method for a low density polyethylene reaction in a tubular reactor in which product quality is maintained, temperature control is utilized to avoid the occurrence of conditions which may damage the equipment and a desired production rate is achieved.

Accordingly, another object of the invention is to provide an apparatus for controlling a polymerization reactor having a feed line for a raw material to be polymerized, cooling means for cooling the reactor using a flow of coolant and an exit line for a product of polymerization in the reactor, comprising a quality sensor for sensing the actual quality of the product in the exit line, a quality controller connected to the quality sensor for receiving a desired product quality set point and comparing it with the actual quality of the product to generate a desired temperature value for the reactor, temperature sensing means associated with the reactor for sensing a representative temperature thereof and temperature control means connected to the temperature sensing means and the quality control means for comparing the representative temperature of the reactor with the desired temperature value therefor to generate a coolant flow value, the temperature control means being connected to the cooling means for controlling the coolant flow according to the coolant flow value whereby fluctuations in product quality are reduced as are deposits of polymer on walls of the reactor due to excessive cooling.

Another object of the invention is to provide such an apparatus wherein a desired production rate set point is manually set and utilized in a production controller which compares the set point to actual production as determined by raw material concentration in the exit line of the reactor, to control all material feed flow to the reactor whereby variations in raw material polymerization rate is considered to avoid fluctuations in the actual production rate.

A still further object of the invention is to provide such an apparatus wherein catalyst supply means for supplying catalyst to various points in the feed line of the reactor, is controlled on the basis of total feed flow to the reactor.

Another object of the invention is to maximize polymerization, in particular to maximize ethylene conversion in the manufacturing process for low density polyethylene, by optimizing certain process parameters such as catalyst flow rate, reactor temperature, coolant flow rate and reactor exit temperature.

Another object of the invention is to provide methods for controlling and optimizing a polymerization reactor and to provide apparatus for doing so which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
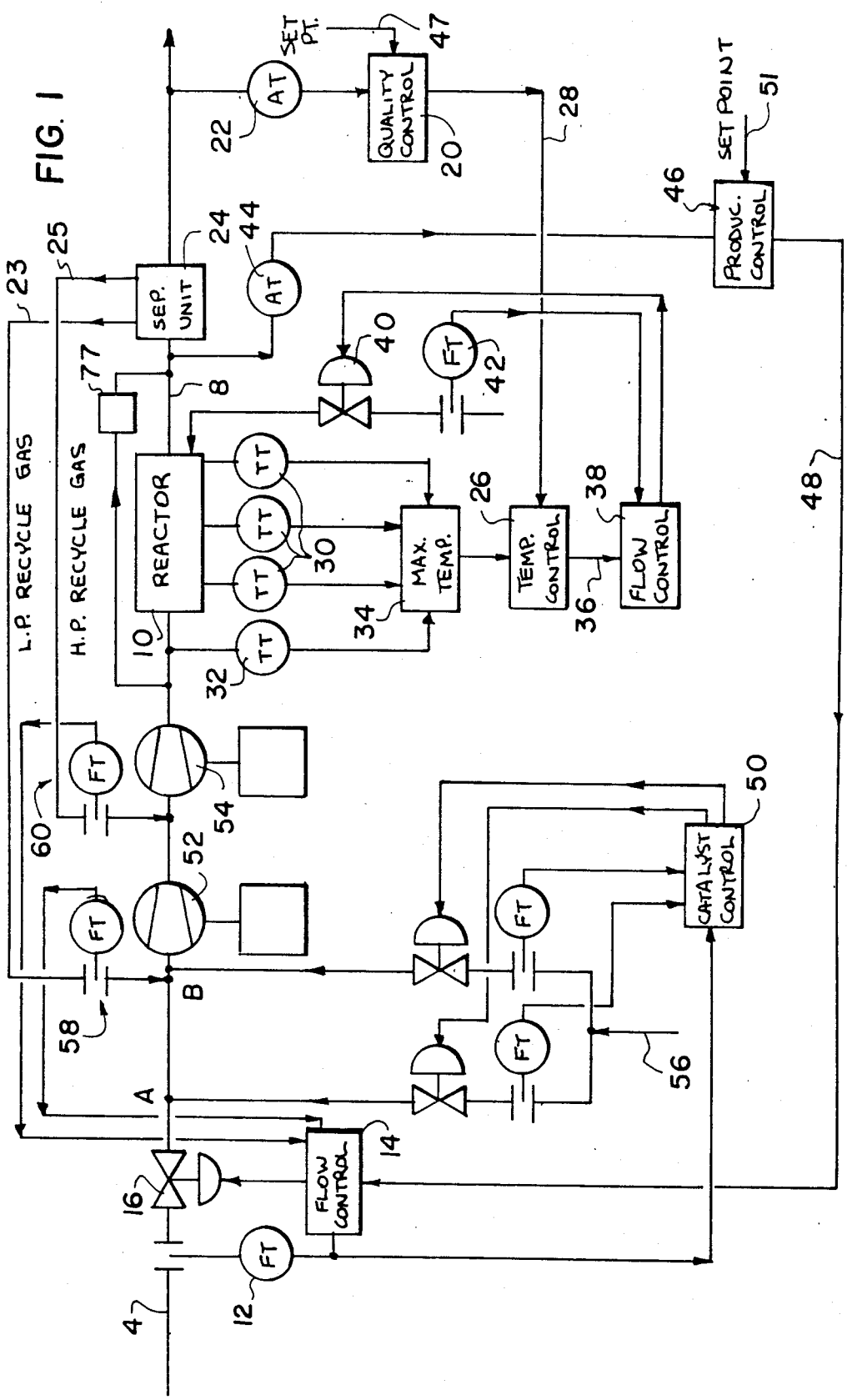
FIG. 1 is a block diagram of a control scheme for a low density polyethylene reactor.

Referring to the drawings in particular, the invention embodied therein, as shown in FIG. 1, comprises a control arrangement for a tubular reactor 10 having a feed line 4, for a raw material which in this case is ethylene. The tubular reactor 10 is for the low density polymerization of ethylene into polyethylene.

An exit line 8 supplies a mixture of ethylene and its polymer to a product separator 24. In known fashion, a primary compressor 52 compresses the ethylene gas which is further compressed by a high pressure compressor 54 before the gas is supplied to reactor 10.

A low pressure cycle arrangement generally designated 58 receives low pressure recycled ethylene gas from product separator 24 over line 23 and supplies to feed line 4 upstream of primary compressor 52. In a similar fashion, high pressure recycled gas is provided over line 25 to high pressure cycle arrangement generally designated 60, to a point in the feed line 4 upstream of high pressure compressor 54.

The complete control of tubular reactor 10 is achieved using a product quality control unit 20, a temperature control unit 26, a production rate control unit 46, a catalyst control unit 50 and a pressure control unit 77.

Product quality is controlled by manipulating reactor temperature. Moreover, temperature control is essential for controlling ethylene conversion, removing heat of reaction, and avoiding reactor tube plugging due to polymer deposits.

As shown in FIG. 1, quality controller 20 receives a product quality set point over line 47 which is compared with an actual product quality sensed by product quality sensor 22 at a point downstream of the product separator 24. The output of quality control unit 20 corresponds to a desired reactor temperature which is applied to temperature control unit 26 over line 28. The desired reactor temperature functions as a set point for temperature controller 26 which receives an actual temperature value from maximum temperature unit 34. Temperature controller 26 may also utilize a representative reactor temperature value to generate a desired flow rate value for coolant to be supplied by a coolant flow valve 40 controlled by a flow controller 38 connected to temperature controller 26. The desired flow rate is applied over line 36 with coolant flow information provided by flow transmitter 42 back to flow controller 38.

The maximum or representative reactor temperature is provided by a plurality of temperature sensors 30 for sensing temperatures along the length of reactor 10, and an input temperature sensor 32.

This control scheme reduces fluctuations in product quality since it is the primary variable and the temperature set point which is determined for a desired product quality. Also, the desired coolant flow rate is determined by the temperature control unit so that excessive cooling is avoided. This in turn reduces polymer deposits in the reactor tube which results from excessive cooling.

Figure 2:
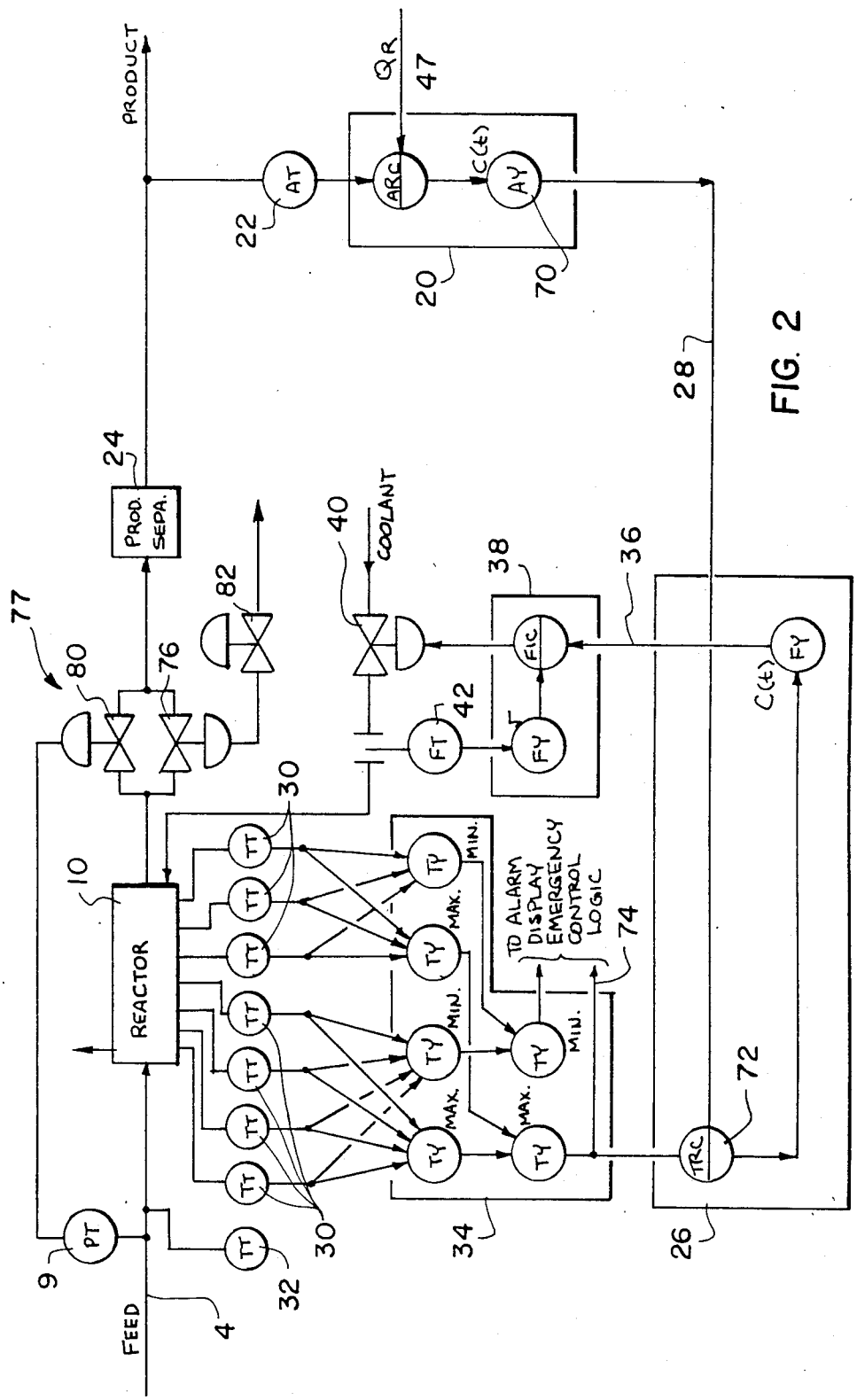
FIG. 2 is a block diagram of portions of the control scheme shown in FIG. 1 for product quality control and pressure control.

FIG. 2 shows a cascade control system for temperature quality control, according to the invention, and in greater detail.

The desired product quality is compared with the actual product quality in unit 20. A suitable delay between reactor and point of quality measurement is applied by delay element 70. A similar delay feature is provided in temperature control unit 26 which includes a temperature controller 72.

The maximum temperature unit 34 provides both maximum and minimum temperature values for reactor 10 which can be provided over lines generally designated 74, for alarm, display and emergency control functions. The maximum temperature value is also provided to temperature control unit 26.

FIG. 2 also illustrates pressure control 77 which facilitates discharge of a polymer-ethylene mixture from reactor 10 via a let down valve arrangement.

Figure 3:
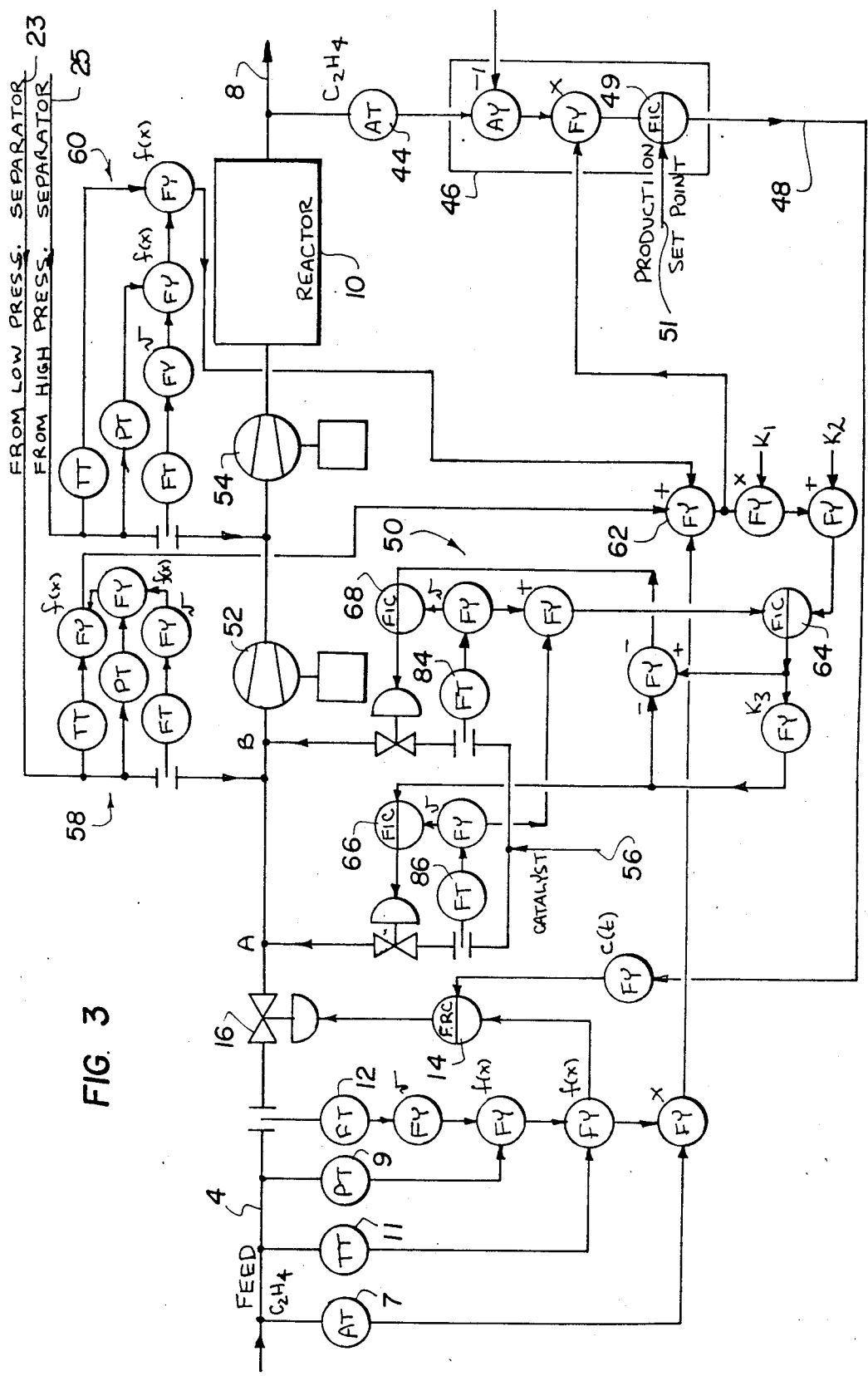
FIG. 3 is a block diagram of portions of the control scheme of FIG. 1 for controlling the addition of catalyst to the reactor and the production rate of the reactor.

Catalyst and production rate control elements are shown in FIG. 3. A desired product rate set point is manually entered in product control unit 46 and an actual production rate is determined from ethylene concentration sensed by concentration transmitter 44. Total feed flow rate for ethylene is also provided to product control unit 46. For this purpose a summation of flows in the high and low recycling circuits, as well as the feed flow from flow transmitter 12 is taken in a summation unit 62, and applied to the product control unit 46.

The output 48 of production control unit 46 acts as a set point for fresh ethylene flow controller 14.

In this way variations in ethylene polymerization rate are taken into account and actual production rate does not fluctuate significantly. Product control unit 46 includes flow controller 49 which receives the desired product rate set point over line 51.

Catalyst flow is controlled by controller 50 which supplies catalyst to a plurality of points on the feed line 4 (labeled A and B). The amount of catalyst added to the reactor feed stream is a function of the quantity of ethylene entering the reactor. The total flow rate is again provided by summing unit 62. This provides a set point for the total catalyst flow controller 64. The output signal from this controller is proportioned for catalyst flow to points A and B over controllers 66 and 68 respectively.

Figure 4:
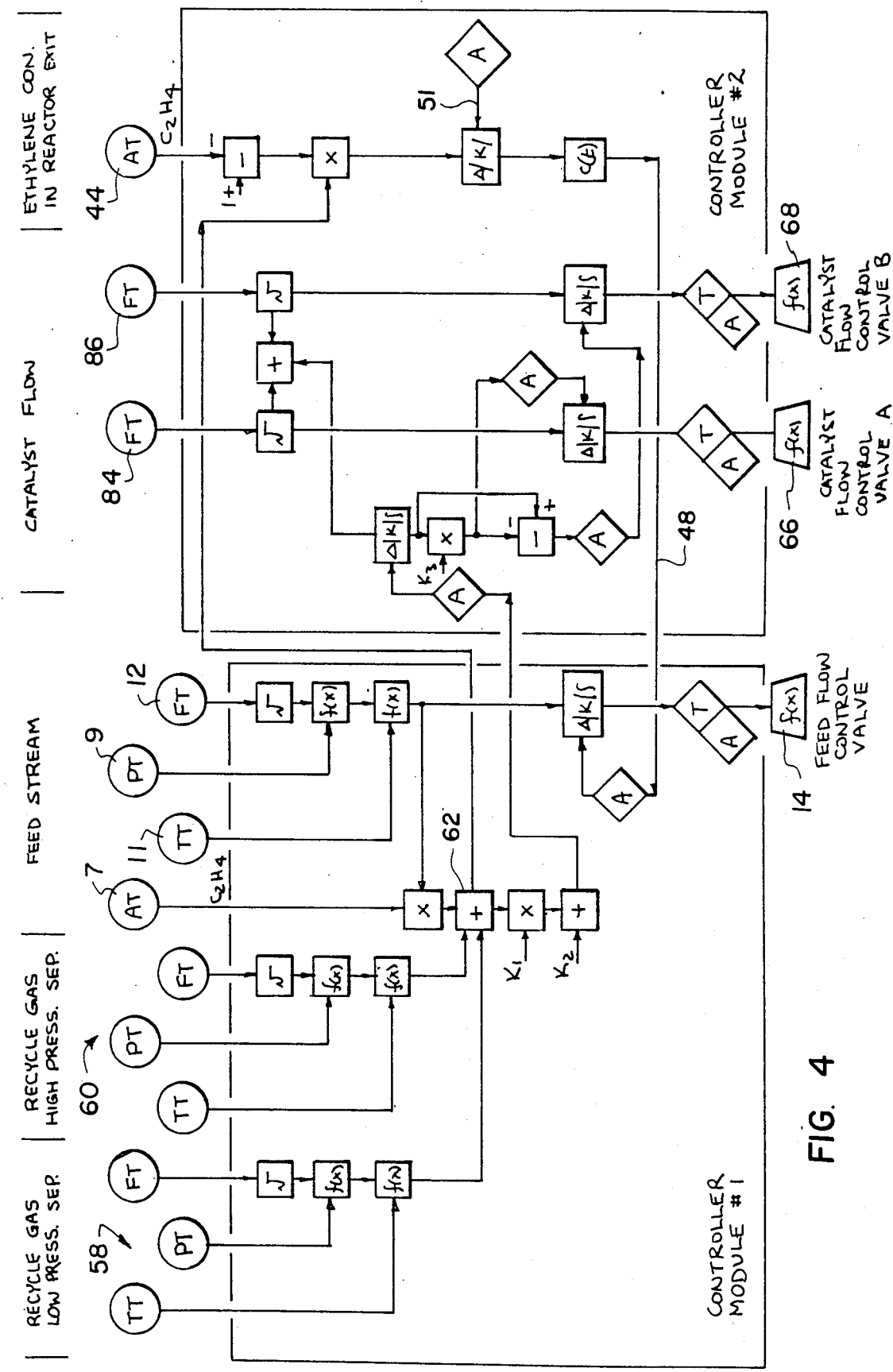
FIG. 4 is a block diagram showing elements for effecting the logic of the inventive control scheme for catalyst addition and production rate control.

The system in general can be simplified by eliminating sensors whose values are constant due to up/downstream control. For example, the ethylene flow pressure is normally held constant. So that pressure transmitter 9 can be eliminated as it is shown in FIG. 4. Temperature transmitter 11 and ethylene concentration transmitter 7 are also provided to modify the flow value from flow transmitter 12 to provide an accurate value for ethylene flow for the summing unit 62. Similar signals are utilized in the recycling arrangements 58 and 60.

The advantages of the above described integrated control system for a tubular reactor in the manufacture of low density polyethylene in particular, includes the requirement of only two set points, one for quality and one for production rate. Consequently, a reduction in operator attention is permitted.

A close control of product quality as a function of reactor temperature is also provided as well as the maintanence of catalyst addition at a desired level.

Close temperature control also reduces the occurrence of conditions which may damage the reactor equipment.

The invention may be implemented using Bailey 7000 Electronic Analog Instrumentation. A microprocessor based on the Network 90 control computer can also be used for control, alarm calculation and operation interface. Network 90 is a trademark of the Bailey Meter Co.

Figure 5:
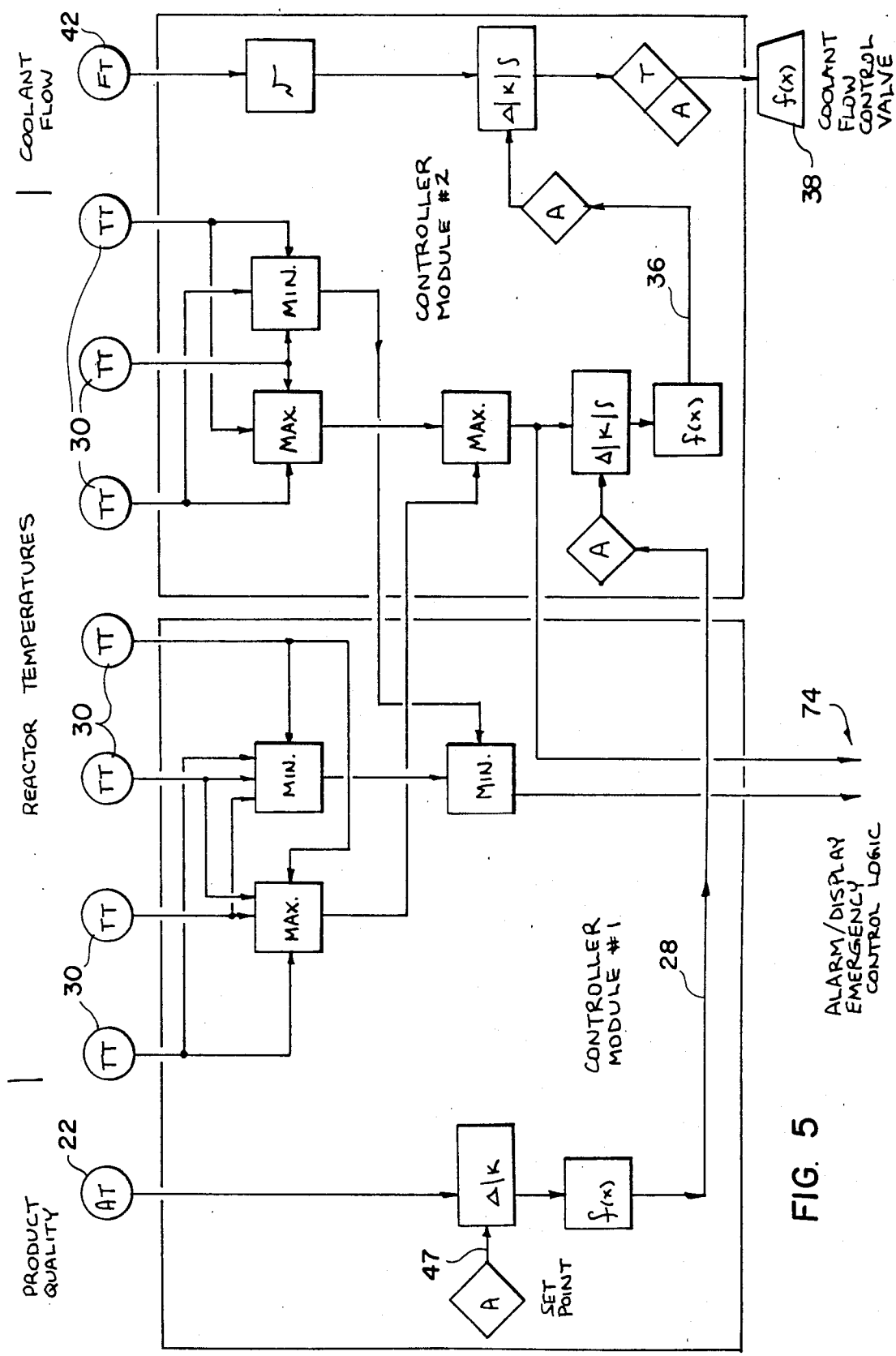
FIG. 5 is a block diagram showing elements for effecting the logic for product quality control in accordance with the invention.

FIGS. 4 and 5 illustrate the use of a Network 90 control module (product specification E 93-906) for implementing the invention. Operator interface may be provided by Digitial Control Stations (product specification E93-902) which are dedicated panelboard devices or by a CRT based Operator Interface Unit (product specification E93-901).

The elements in FIGS. 4 and 5 are labeled with numerals corresponding to those in FIGS. 1 through 3, and with symbols to indicate functions to be achieved by each element.

Figure 6:
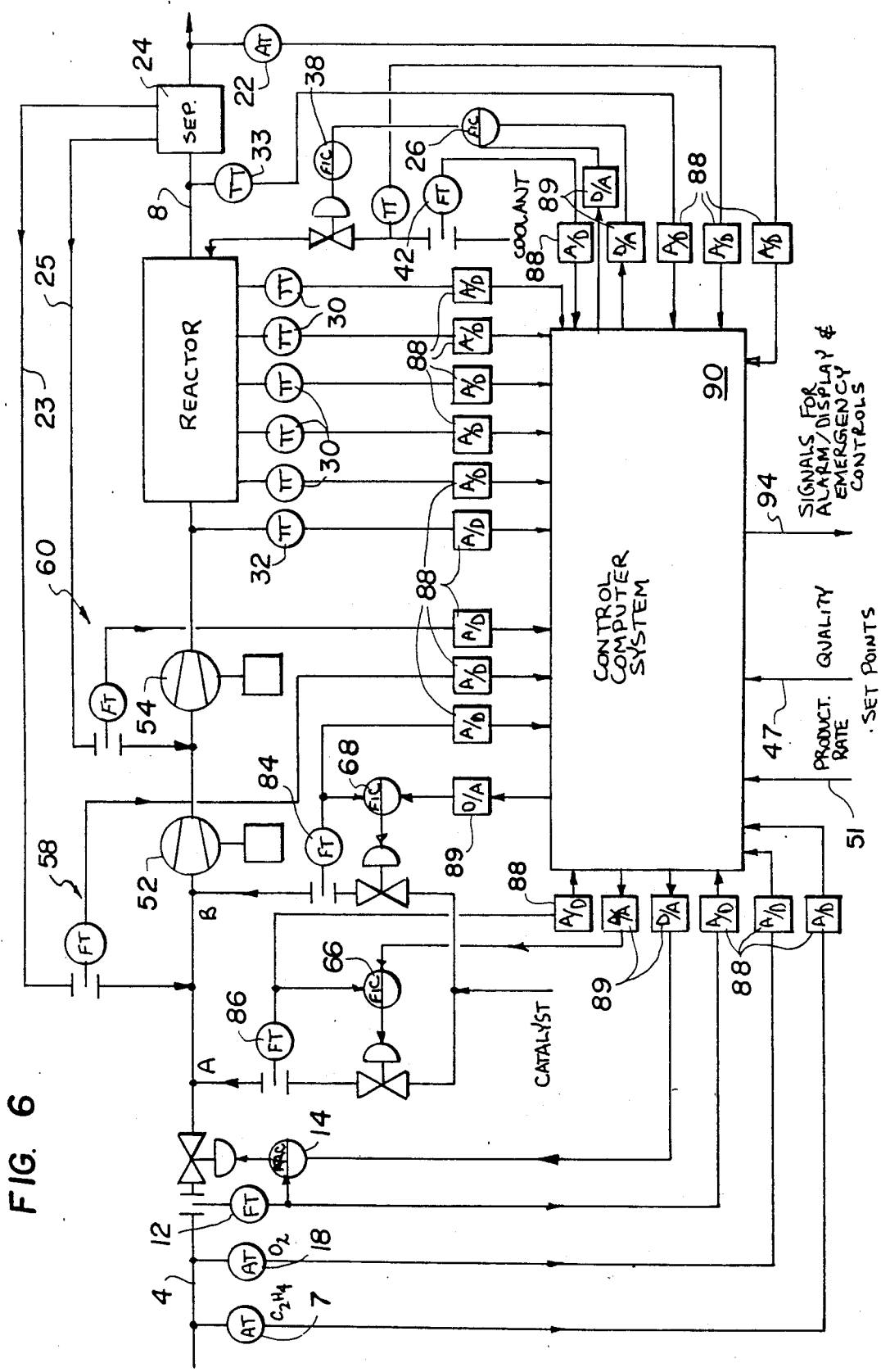
FIG. 6 is a block diagram showing an ethylene polymerization reactor with controls in accordance with a further embodiment of the invention.
Figure 7:
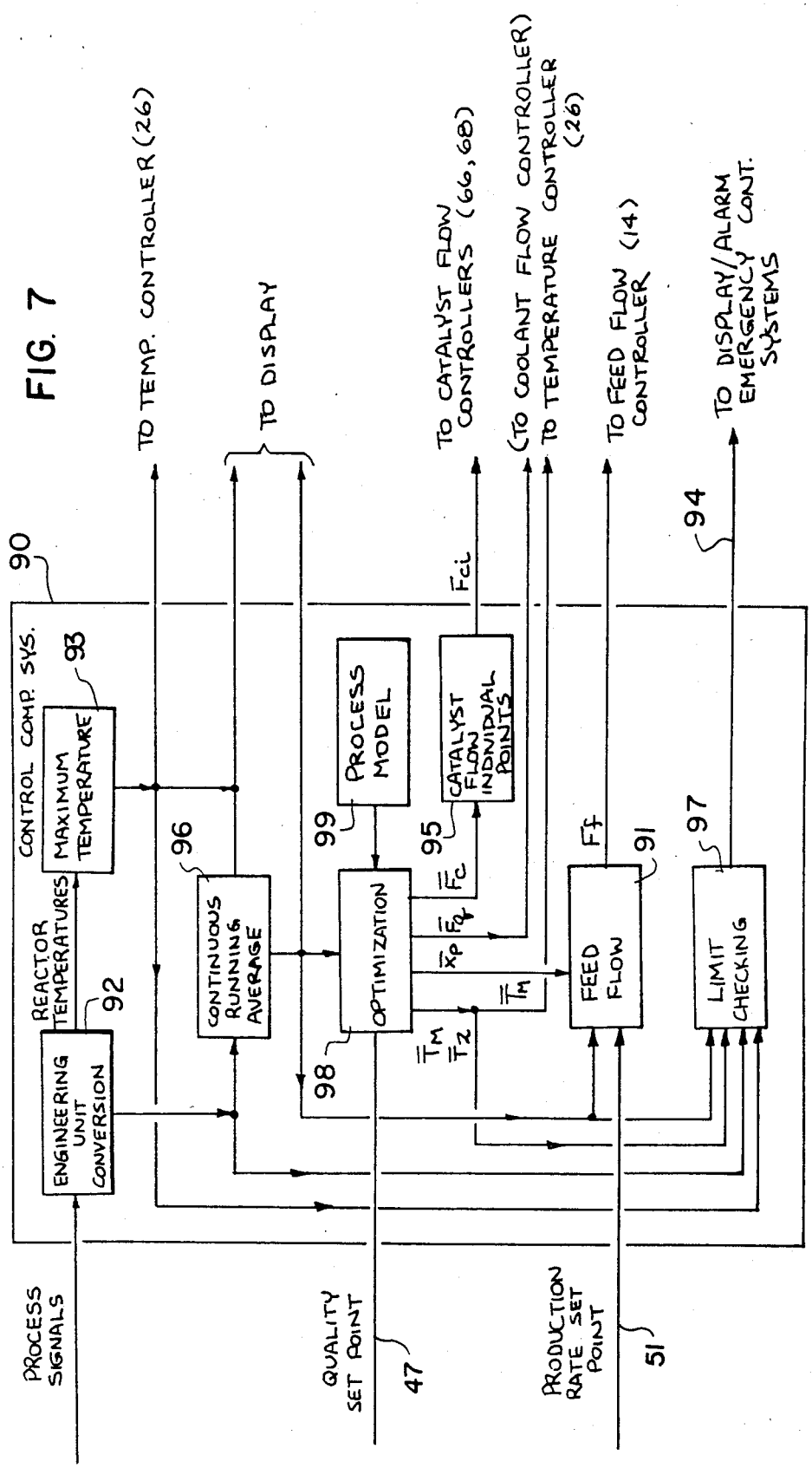
FIG. 7 is a block diagram showing the elements of a control computer system used in accordance with the embodiment of FIG. 6.

FIGS. 6 and 7, where corresponding numerals signify the same or similar parts as in FIGS. 1 through 3, an optimizing control system for ethylene conversion is disclosed.

In general, control systems are based on a fixed ethylene conversion per pass through the reactor, due to the importance of heat removal. The amount of conversion per pass is actually lower than the recommended value for plant operation and significantly lower than plant design values. This is due to the fact that operating personnel wish to maintain reactor operations well within safe limits which is well justified. Lower conversion per pass however, result in increased plant operating cost due to recompression of recycled gases from low and high pressure separators, and interstage cooling during compression.

The embodiment of the invention as shown in FIGS. 6 and 7 provides an optimizing control which maximizes conversion per pass within the constraints placed by reactor cooling, production rate, polymerization reaction, and the like.

To better understand the invention, the following process analysis should be considered.

The total amount of catalyst to be added to the reactor feed stream is a function of feed flow rate, maximum reactor temperature and desired product quality. Functionally, this relationship is epxressed by:

$$F_c = f_1[F_f, T_m, Q_R] \quad (1)$$

where;

$F_c$ = total catalyst flow rate [lbs/hr.]
$F_f$ = Total ethylene flow rate [lbs/hr.]
$T_m$ = Maximum Reactor Temperature [°R]
$Q_R$ = Desired product quality.

Equation (1) can be obtained either by regression analysis of plant operating data and catalyst data provided by its manufacturer for a specific catalyst.

It is noted that operating pressure does not affect catalyst flow since reactor pressure is fixed and constant due to compressor operation. Contributions to pressure fluctuations have therefore been omitted.

As catalyst added at several points in the feed stream (A and B in FIG. 6) flow at each point is given by $$F_{ci} = P_i F_c \quad (2)$$

where;

$F_{ci}$ = Catalyst flow at point i [lbs/hr.]
$P_i$ = Fraction of total flow added at point i (a constant).

Also:

$$\Sigma P_i = 1 \quad (3)$$

$$\Sigma F_{ci} = F_c \quad (4)$$

The constraint on total catalyst flow is established by a maximum and minimum flow allowed as follows:

$$F_c \min \leq F_c \leq F_{cmax} \quad (5)$$

In the reactor 10, conversion paths for ethylene polymerization is a function of several variables, and is functionally given as:

$$X_p = f_2[X_E, A_1, E_1, T_m, F_c, F_f, T_i, T_2, T_{c1}, F_q, Q] \quad (6)$$

where;
$X_p$ = Ethylene conversion per pass
$X_E$ = Ethylene concentration in reactor feed stream
$A_1$ = Pre-exponential factor for reaction rate constant
$E_1$ = Activation energy for reaction rate constant
$A_1, E_1$ = Parameters related to catalyst characteristics, which can be determined by regression analysis of plant operating data
$T_m$ = Maximum reactor temperature (°R)
$F_c$ = Total feed flow rate (lbs/hr.)
$T_i$ = Temperature of reactor feed stream (°R)
$T_2$ = Temperature of reactor exit stream (°R)
$T_{c1}$ = Inlet temperature of reactor coolant
$F_q$ = Coolant flow rate (lbs/hr.)
Q = Product quality.

Equation (6) can be obtained from state of the art knowledge as found for example, in *Theory of Free Radical Polymerization*, K. S. Bagdasar'yan, 1968 and *Chemical Engineering Kinetics*, J. M. Smith, McGraw Hill, 1970.

The limits on variables in equation (6) are as follows:

$$O \leq X_p \leq X_{p\ max} \quad (7)$$

$$T_{m\ min} \leq T_m \leq T_{m\ max} \quad (8)$$

$$T_{2\ min} \leq T_2 \leq T_{2\ max} \quad (9)$$

$$F_q\ min \leq F_q \leq T_q\ max \quad (10)$$

$$Q_{min} \leq Q \leq Q_{max} \quad (11)$$

The quality of the low density polyethylene is a function of maximum reactor temperature and catalyst addition to reactor feed stream. For a given feed flow rate, this relationship is functionally given as:

$$Q = f_3[T_m, F_c] \quad (12)$$

Equation (12) can be determined by regression analysis of operating data.

One of the objectives of an ethylene manufacturing process is to minimize variations in product quality due to fluctuations in other operating variables. Consequently, it is desired that:

$$Q_R - Q = 0 \quad (13)$$

where;
$Q_R$ = Desired product quality
$Q$ = Actual product quality.

From equations (12) and (13), we have:

$$Q_R - f_3[T_m, F_c 9 = 0 \quad (14)$$

Low density polyethylene production rate is dependent on total feed flow rate, ethylene concentration in the reactor's feed stream and conversion per pass in the reactor. This relationship is functionally expressed as:

$$P = f_4[F_f, X_E, X_9] \quad (15)$$

The problems to be overcome thus in optimizing the reactor control, is to maximize $$P_2[X_E, A_1, E_1, T_m, F_c, F_f, T_1, T_2, T_c, F_q, Q]$$

with respect to $T_m, F_c, F_q$ and $T_2$ such that the following limitations are satisfied:

$$F_c = F_1[F_f, T_m, Q_R];$$

$$Q_R - f_3[T_m, F_c] = 0;$$

$$F_{c\ min} \leq F_c \leq F_{cmax};$$

$$F_{q\ min} \leq F_q \leq F_{qmax};\ \text{and}$$

$$T_{2\ min} \leq T_2 \leq T_{2\ max}.$$

A solution to the optimization problem can be obtained by a known optimization algorithm discussed in *Optimization-Theory and Practice*, G. S. G. Beveridge and R. S. Schechter, McGraw Hill, New York, N.Y., 1970.

This analysis gives the folliwing values:
Catalyst flow rate $\overline{F}hd\ c$;
Reactor Temperature $\overline{T}_m$;
Coolant flow rate $\overline{F}_q$;
Reactor Exit Temperature $\overline{T}_2$; and
Maximum conversion $\overline{X}_p$ (value of function $f_2$).

These values are utilized in the control system of the invention as shown in FIGS. 6 and 7.

The control system utilizes control computer 90 which receives inputs from the various sensors of the invention through analog to digital converters 88. Control outputs from the computer to the plant are interfaced through digital to analog converters 89.

Signals for alarm, display and emergency control are provided over line 94.

Major blocks of the control system of FIG. 6 are shown in FIG. 7.

All measured process signals are converted into engineering units and processed for noise in engineering unit conversion block 92, and using state of the art methodology. Reactor temperature data, from reactor temperature sensors 30, input temperature sensor 32 and output temperature sensor 33, are processed in block 93 to obtain a maximum temperature. The output of block 93 is provided to temperature control 26 which controls flow of coolant over controller 38 and the valve in the coolant circuit.

The outputs from blocks 92 and 93 are provided to a block 96 for obtaining a continuous running average of the processed data. Signals are sampled at intervals $\Delta$ T minutes. The output of blocks 92, 93 and 96 are also provided to a limit checking block 97 for detecting an alarm condition and providing an alarm and emergency control signal over line 94.

An optimization program for an optimized process model is provided from process model 99. The process model is established according to the foregoing process analysis.

The optimization program is executed every $\Delta$ T minutes which is greater than or equal to five minutes and less than or equal to 15 minutes. This execution period is established using the continuous running average data of block 96 and the desired quantities for the various parameters obtained in optimization block 98.

Optimization block 98 thus establishes a desired catalyst flow rate $\overline{F}_c$, desired temperature $\overline{T}_m$, maximum conversion $\overline{x}_p$, desired maximum coolant flow rate $\overline{F}_q$ and desired reactor exit temperature $\overline{T}_2$.

Maximum temperature $\overline{T}_m$ is output as a control signal for temperature controller 26 acting as a set point. Controller 26 generates the desired coolant flow rate set point for controller 38 which manipulates coolant flow rate to reactor 10 as noted above.

In another embodiment of the invention, desired coolant flow $\overline{F}_q$ can be directly output to coolant flow rate controller (not shown) thus eliminating the temperature controller 26.

Maximum conversion signal $\overline{x}_p$ is provided through feed block 91 where the desired feed flow rate for the specified product rate is determined by expression (15) and output to feed flow controller 14.

Maximum catalyst flow signal $\overline{F}_c$ is provided over block 95 to control catalyst flow to the individual points A and B in the feed stream. Catalyst flow at each point of addition is determined by equation (2) and values for $P_i$ are manually entered. The output of block 95 is provided to the catalyst flow controllers 66 and 68.

To provide the required signals, in addition to flow transmitter 12 and etheylene contration transmitter 7 on feed line 4, an oxygen concentration transmitter 18 is provided since this variable affects ethylene conversion, as well.

While specific embodiments of the invention have been shown and described in detail to illustrate the application of the principles of the invention, it will be understood that the invention may be embodied otherwise without departing from such principles.

What is claimed is:

1. A polymerization reactor comprising:
   a feed line connected to an input of said reactor for transporting a raw material to be polymerized to the reactor;
   cooling means for cooling the reactor including means for causing a flow of coolant to the reactor;
   an exit line connected to an exit of said reactor for transporting a product of polymerization from the reactor;
   a product separator connected in the exit line beyond said reactor for separating the product from the raw material;
   quality sensing means positioned and arranged so as to sense the actual quality of the product in the exit line beyond said product separator;
   quality controller means connected to said quality sensing means for receiving a desired product quality set point and comparing it with the actual quality of the product and generating a desired temperature value of the reactor;
   temperature sensing means associated with the reactor and positioned and arranged to sense a representative temperature thereof;
   temperature control means connected to said temperature sensing means and to said quality controller means for comparing the representative temperature of the reactor with the desired temperature value therefor to generate a coolant flow value, said temperature control means connected to the cooling means for controlling the coolant flow to the reactor in accordance with the coolant flow value;
   a raw material flow regulator in the feed line for regulating an amount of raw material supplied to the reactor;
   a raw material concentration sensor in the exit line between said reactor and said product separator for sensing an amount of raw material admixed with the product in the exit line; and
   production rate controller means connected to said raw material concentration sensor and to said raw material flow regulator for receiving a desired production rate as a set point and comparing it with an actual production rate determined as a function of the raw material concentration therefor to generate a raw material feed flow rate value, said production rate controller means connected to said raw material flow regulator for regulating the amount of raw material supplied to the reactor in accordance with the raw material feed flow rate value.

2. An apparatus according to claim 1, wherein said temperature sensing means includes a plurality of temperature detectors throughout said polymerization reactor connected to a maximum temperature unit which is constructed so as to sense a maximum temperature of the reactor which forms the representative temperature thereof.

3. An apparatus according to claim 1, wherein said quality sensing means is a raw material concentration sensor which is constructed so as to sense a concentration of raw material in the exit line as a measure of actual product quality.

4. An apparatus according to claim 1, including at least one return line connected between said separator and the feed line for returning raw material to the feed line, a second raw material flow regulator in said at least one return line and flow summing means connected to said first mentioned and second raw material flow regulators for determining a total amount of raw material supplied to the feed line, said flow summing means connected to said production rate controller means for providing said production rate controller means with a total flow value for raw material to the feed line.

5. An apparatus according to claim 4, including catalyst supply means connected to at least one point of the feed line for supplying a catalyst at a selected catalyst flow rate to the feed line, catalyst controller means connected to said catalyst supply means and to said flow summing means for controlling said catalyst supply means in accordance with a total flow of raw material to the feed line.

6. An apparatus according to claim 5, wherein said production rate controller means, said quality controller means and said catalyst controller means are contained with a control computer, said temperature sensing means comprising a plurality of temperature sensors connected to the reactor for sensing temperatures along the reactor, an input temperature sensor connected to the feed line for sensing the temperature of raw material to the reactor and an output temperature sensor connected to the exit line for sensing the temperature of material in the exit line, said temperature sensing means further including a maximum temperature block for determining the maximum temperature of the reactor, said maximum temperature block incorporated in said control computer, said flow summing means including a flow transmitter in the feed line and the at least one return line, and means for combining flow values incorporated into said control computer, said control computer including a unit conversion block for receiving signals from said temperture sensors and flow transmitters and signals from said raw material concentration sensor and said product quality sensor, a continuous running average block connected to said maximum temperature block and said unit conversion block for periodically sampling signals from said unit conversion block and maximum temperature block, and optimization block connected to said continuous running average block for receiving the sampled signals and receiving the desired product quality set point, a process model including parameters for variables of the polymerization process in the reactor connected to said optimization block so that said optimization block generates values corresponding to maximum reactor temperature, maximum coolant flow rate, maximum total catalyst flow rate and maximum production of the reactor corresponding to optimal conditions therefor, said optimization block connected to said production rate controller means for applying the maximum production rate value thereto to control said raw material flow regulator means said optimization block connected to said catalyst controller means for applying said maximum catalyst flow rate thereto to control the amount of catalyst added to the feed line.

7. An apparatus according to claim 6, wherein said control computer includes a limit checking block connected to said unit conversion block, said continuous running average block, said maximum temperature block and said optimization block for checking limits of values therefrom and generating an alarm signal upon diversion of signals from said limits therefor.

8. A tubular olefin polymerization reactor comprising:
   a feed line connected to an input of said reactor for transporting olefin to be polymerized to the reactor, with at least one compressor therein for compressing the olefin;
   an exit line connected to an exit of said reactor for transporting a product of polymerization from the reactor, with a separator for separating polymerized product from the olefin with at least one return line connected to the feed line before said at least one compressor for returning separated olefin to the feed line upstream of the at least one compressor;
   a first flow transmitter in the feed line for sensing flow of olefin to the reactor;
   at least one second flow transmitter in the return line for sensing flow of olefin returned from the separator;
   an olefin flow valve in the feed line for controlling the flow of olefin to the reactor;
   olefin flow controller means connected to said olefin flow valve for controlling the rate of olefin supplied through the feed line;
   an olefin concentration sensor connected to the exit line between the reactor and the separator for determining the concentration of olefin left in a mixture of olefin and polymerization product from the reactor;
   production rate controller means connected to the olefin concentration sensor for receiving a desired production rate set point, said production rate controller means connected to said olefin flow controller means for controlling olefin flow rate in the feed line;
   a product quality sensor connected to the feed line beyond the separator for sensing the actual quality of product from the separator;
   quality controller means for receiving a desired quality set point, connected to said product quality sensor for comparing the actual product quality with the desired product quality and generating a desired temperature set point;
   flow means connected to the reactor for supplying the reactor with a flow of coolant;
   coolant flow controller means connected to said coolant flow means;
   temperature controller means connected to said quality controller means for receiving the desired temperature set point;
   maximum temperature sensing means connected to the reactor positioned and arranged for determining the maximum temperature thereof, said maximum temperature sensing means connected to said temperature controller means, said temperature controller means constructed so as to compare the maximum temperature with the desired temperature set point to control said coolant flow controller means for establishing the desired temperature of the desired temperature set point in the reactor to avoid overcooling of the reactor and fouling of the reactor by polymerization product;
   catalyst flow means connected to at least one point on the feed line for supplying a flow of catalyst to the feed line; and
   catalyst controller means connected to the first and second flow transmitters and connected to said catalyst flow means for regulating flow of catalyst to the feed line as a function of olefin flow to the feed line.

9. A tubular olefin polymerization reactor comprising:
   a feed line connected to an inlet of said reactor for transporting olefin to be polymerized to the reactor;
   an exit line connected to an outlet of said reactor for transporting a product of polymerization from the reactor;
   a separator on the exit line for separating polymerization product from olefin;
   at least one olefin return line connected between the separator and the feed line for returning olefin to the feed line;
   at least one compressor on the feed line for compressing olefin to be supplied to the reactor;
   a first flow transmitter on the feed line;
   a second flow transmitter on the at least one olefin return line;
   an olefin flow valve on the feed line for regulating flow of olefin to the reactor;
   olefin flow controller means connected to said olefin flow valve for control thereof;
   an olefin concentration sensor connected to the exit line before the separator for determining the concentration of olefin left in a mixture of olefin and polymerization product from the reactor;
   production rate controller means connected to the olefin concentration sensor for receiving a desired production rate set point, said production rate controller means connected to said olefin flow controller means for controlling olefin flow rate in the feed line;
   catalyst supply means including a catalyst flow valve connected to the feed line for supplying catalyst to the feed line;
   catalyst flow controller means connected to said catalyst flow valve for control thereof;
   a first temperature sensor in the feed line before the reactor, a second temperature sensor in the exit line between the reactor and the separator and a plurality of third temperature sensors connected to the reactor;
   a product quality sensor connected to the feed line beyond the separator for sensing product quality from the separator; and a control computer connected over analog to digital converters to each of said sensors and transmitters, and over digital to analog converters to each of said controller means, said control computer including means for optimizing once through polymer production in the reactor by maximizing permitted maximum temperature values for the reactor, coolant flow values for the reactor, catalyst flow values for the reactor and quality values for the reactor.

10. A polymerization reactor comprising:

a feed line connected to an inlet of said reactor for transporting a raw material to be polymerized to the reactor;

an exit line connected to an outlet of said reactor for transporting a product of polymerization from the reactor;

a product separator connected in the exit line beyond said reactor for separating the product from the raw material;

raw material flow regulator means in the feed line for regulating an amount of raw material supplied to the reactor;

a raw material concentration sensor in the exit line before said product separator for sensing an amount of raw material admixed with product in the exit line; and production rate controller means connected to said raw material concentration sensor and to said raw material flow regulator means for receiving a desired production rate as a set point and comparing it with an actual production rate determined as a function of the raw material concentration therefor to generate a raw material feed flow rate value, said production rate controller means connected to said raw material flow regulator means for regulating the amount of raw material supplied to the reactor in accordance with the raw material feed flow rate value.

* * * * *